Jan. 19, 1937.  A. W. KRETZSCHMAR  2,067,932
SPEED GOVERNOR
Filed April 17, 1935   2 Sheets-Sheet 1
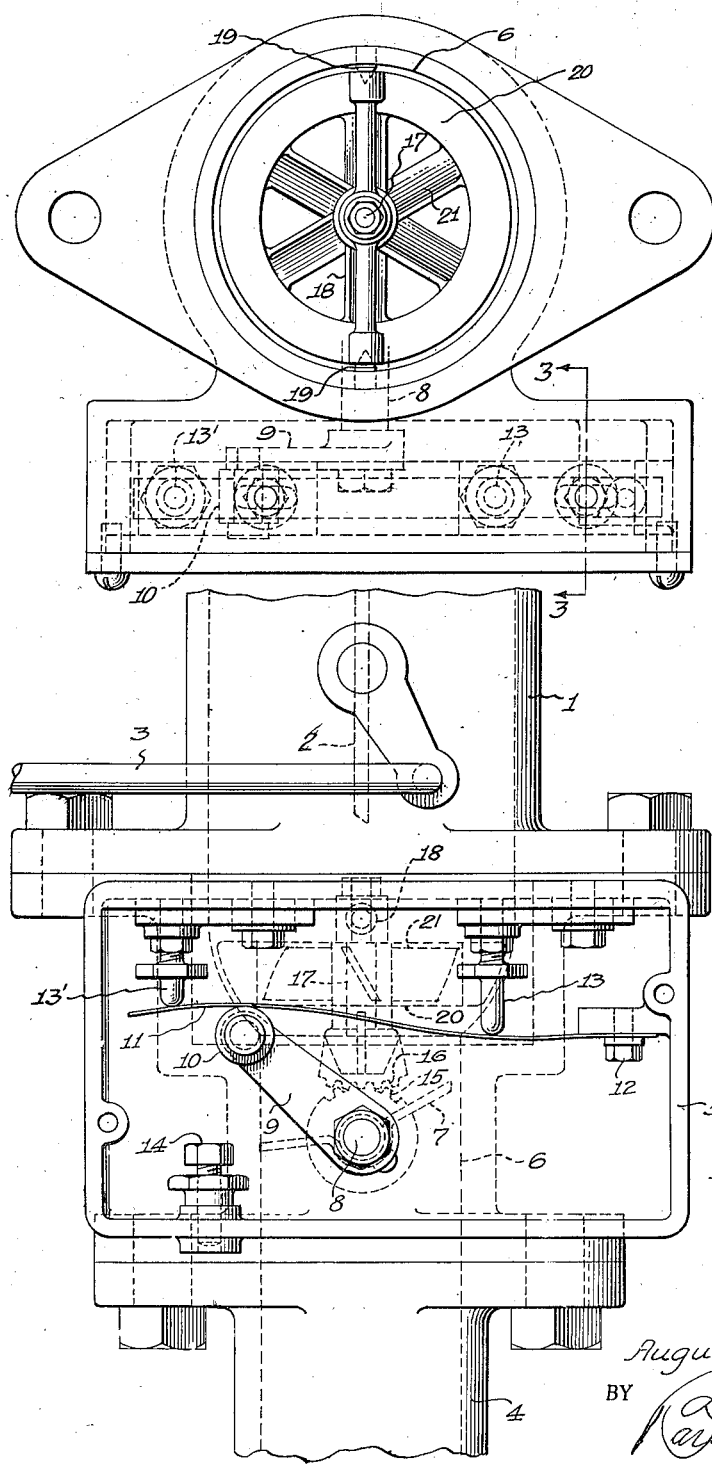
INVENTOR.
August W. Kretzschmar,
BY
ATTORNEYS

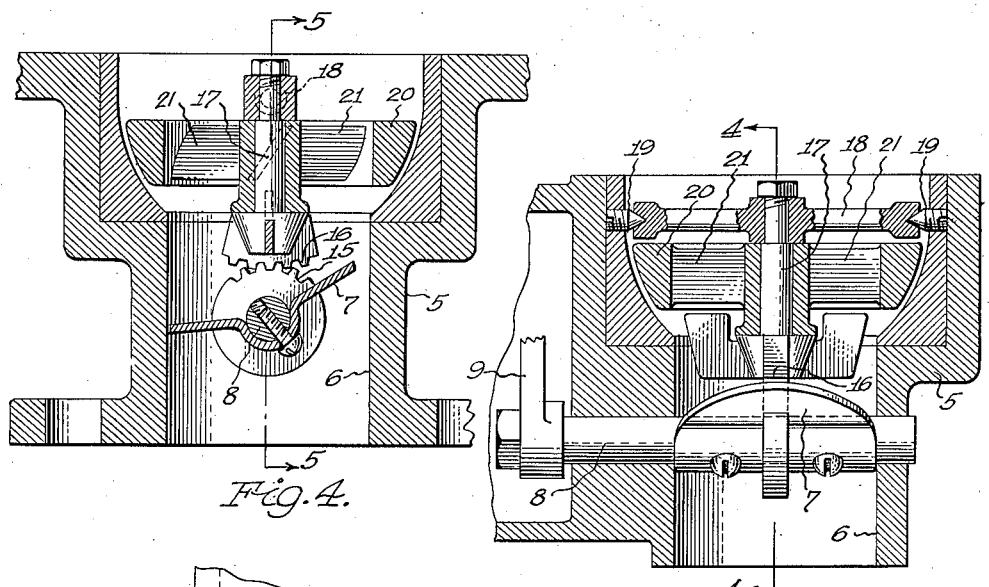
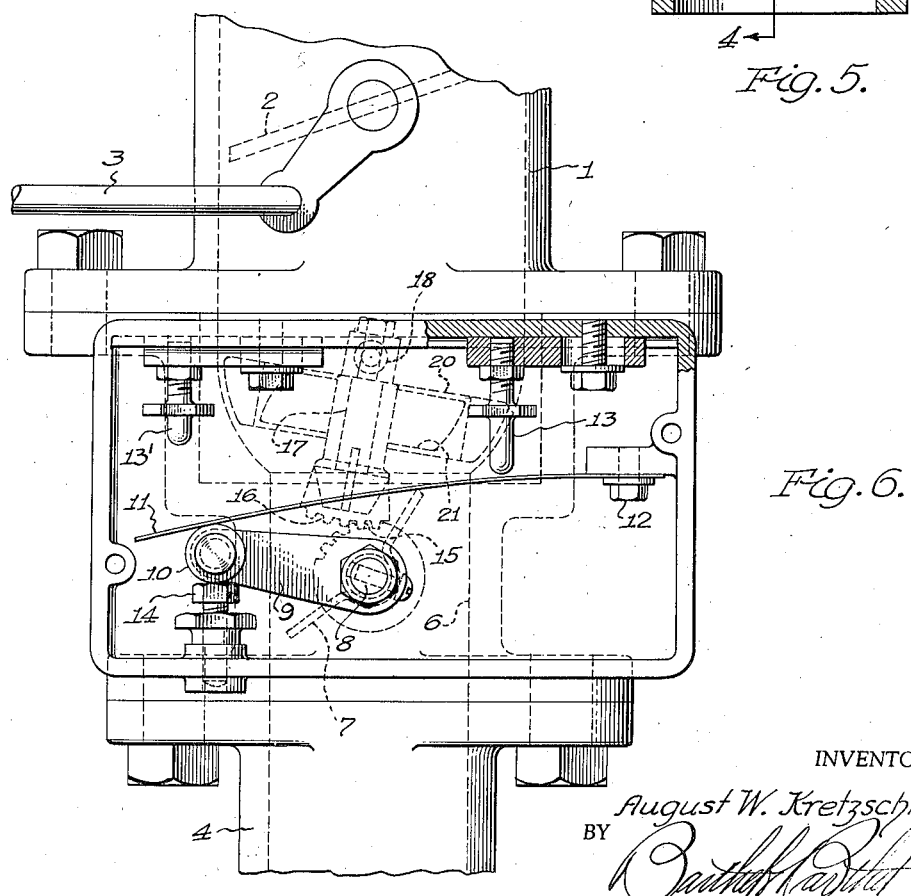

Patented Jan. 19, 1937

2,067,932

UNITED STATES PATENT OFFICE 2,067,932

SPEED GOVERNOR

August W. Kretzschmar, Detroit, Mich.

Application April 17, 1935, Serial No. 16,805

5 Claims. (Cl. 137—152)

This invention relates to governing devices for internal combustion engines equipped with a carburetor and manifold and has for its object to provide means for limiting the maximum speed thereof to any predetermined amount which will remain substantially constant for running on the level or under any constant load or up or down grade, and which will not interfere with the full engine power during starting and accelerating until that maximum speed is reached.

Conventional engine controls of this type include a flyball governor run from an engine shaft. The valve controlled thereby gradually close with increasing engine speed and the result is a choking of the fuel supply under increasing engine speeds. The result is loss of possible acceleration and lack of response for road maneuvers such as is expected from an underpowered vehicle. It is an object of this invention to overcome the drawbacks of such governors by the use of a fuel control valve subject to a combination of forces capable of producing a snap action for throwing it from two predetermined maximum positions.

A further object is to employ the velocity of the fuel flow as one force tending to move the valve and to provide a manually variable spring resistance as the other force against which the first named force is called upon to act, one of these forces tending to rotate the valve in one extreme position, the other tending to rotate the valve to its other extreme position.

Another object is to provide a pendulum for connection to the valve and which exerts a force independent of the other two forces for rotating the valve to compensate in possible fuel flow for up and down grades, it being understood that the valve and the pendulum axis are so mounted with respect to the direction of travel that response to inclination and declination of the fuel system results in pendulum movement.

A further object is to so position and arrange the respective parts that the pendulum will swing the governor valve to its maximum open position under acceleration in a forward direction.

A further object is to construct the pendulum in the form of a weighty wheel for residence within the intake manifold and capable of free rotation, and to form the spokes of this wheel as vanes for the impingement of the fuel flow thereagainst. I am unable to explain whether there is a gyroscopic action of consequence as a result of this but I do know that the device seems to operate better with the flywheel free to rotate. There is also improved fuel economy possibly due to the twisting action imparted to the fuel by the vanes, which are inclined.

A better understanding of the invention will be had with reference to the accompanying drawings wherein my invention is illustrated by way of example and in which—

Figure 1 is a side elevation of my improved governing device with the cover removed, showing the parts in governing position;

Fig. 2 is a top plan view of the device;

Fig. 3 is a section taken along the line 3—3 of Fig. 2;

Fig. 4 is a vertical section taken along the line 4—4 of Fig. 5;

Fig. 5 is a vertical section taken along the line 5—5 of Fig. 4, and

Fig. 6 is a view similar to Fig. 1 showing the parts in rest position.

1 refers to a manifold section which is adapted to have a carburetor (not shown) resting on the upper end thereof. Within the section 1 is the usual throttle valve 2 connected by a linkage 3 to a position of manual manipulation. 4 designates a further manifold section leading to an engine (not shown) at its lower end. Between the sections 1 and 4 is my governing device.

The device has a main casing 5, a part 6 of which constitutes a conduit co-axial with the sections 1 and 4. This part 6 has a butterfly valve 7 supported by a shaft 8, the axis of which is parallel with the axis of the valve 2 and normal to the direction of forward travel. The valve 7 is so formed that when one wing thereof is horizontal the other wing will be elevated by a substantial number of degrees, say 25 to 30 degrees. Secured on the shaft 8 outwardly of the conduit 6 is an arm 9 having a roller 10 on the outer end thereof for engagement by a suitable resiliency which is preferably a long thin, light, single leaf spring 11 anchored to the casing 5 at 12. Two substantially spaced manually adjustable abutments 13 and 13' are abutments for stiffening the spring when the arm 9 is in its uppermost position as shown in Fig. 1. A manually adjustable stop 14 limits the downward rotation of the lever 9 and hence determines the amount of initial opening by the valve 7 in its position of rest.

The shaft 8 is provided with gear teeth 15 for engagement with teeth 16 on a shaft 17 suspended from a freely rockable shaft 18 suspended between bearing points 19. The shaft 17 has a weighty wheel 20 freely rotatable thereon. The wheel with its shaft 18 and bearings 19 constitutes a pendulum and also an inertia device so that as the vehicle and the conduits 1 and 4 assume an inclination because of up or down grade travel the pendulum will act to rotate the valve 7 to a more open position in the first case and to a more nearly closed position in the second case; and upon acceleration or deceleration of the vehicle the pendulum will tend to open the valve 7 and to close it respectively. The design is such that the number of degrees through which the pendulum swings is multiplied preferably about four times in the rotation of the valve 7.

The wheel 20 has spokes 21 constructed as inclined vanes so that the gases rotate the wheel and the liquid particles therein are broken up.

At the beginning of operation the parts are in the position shown in Fig. 6. As illustrated, the leaf spring 11 is out of contact with both abutments 13 and 13' and the valve 7 is open extensively. It will be noted that the valve 7 presents a considerably larger passage at the right side of the conduit, as viewed in the drawings, than at the left side. As the gases increase their volume and velocity therepast, apparently there is a vacuum behind these valve sides which is greater behind the side with greatest inclination. As the vacuum builds up there is no appreciable response by the valve but merely a sort of quivering until a sufficient force is built up to cause the valve to snap to the maximum closed position as illustrated in Fig. 1. The speed at which this snap action will occur depends upon the resistance of the spring. The spring is very light and sensitive. By changing the abutment 14 the speed valve can be varied entirely as desired. The extent of the closing of the valve can be varied by varying the positions of the abutments 13 and 13' by which the position of spring stiffening is altered. The several points of abutments for the spring 11 is a highly desirable feature. The anchorage 12 can be changed in height also, as by the use of shims.

While my invention is illustrated as being designed for a down draft carburetor, it will be obvious to anyone skilled in the art that it may be readily adapted for any type engine and hence I desire to be extended protection within the scope of the appended claims.

What I claim:—

1. In a speed governing device, the combination of a fuel supply conduit, a valve in said conduit sensitive to the fuel flow therepast for movement open and closed positions, spring means resisting the movement to closing position, and a pendulum device associated with said valve for compensating its position for up and down grade travel.

2. The combination as set forth in claim 1 wherein said pendulum device comprises a freely oscillable shaft, a weight intermediate the length of said shaft, gear teeth on the lower end of said shaft, and gear teeth mounted on the axle of said valve for engagement with the teeth of said shaft whereby swinging of said pendulum effects rotation of said axle and said valve.

3. The combination as set forth in claim 1 wherein said pendulum device comprises a freely oscillable shaft, a weight intermediate the length of said shaft, gear teeth on the lower end of said shaft, and gear teeth mounted on the axle of said valve for engagement with the teeth of said shaft whereby swinging of said pendulum effects rotation of said axle and said valve, said pendulum device residing within said conduit and including a freely rotatable wheel with spokes of vane shape against which the fuel impinges.

4. The combination as set forth in claim 1 wherein said pendulum device comprises a freely oscillable shaft, a weight intermediate the length of said shaft, gear teeth on the lower end of said shaft, and gear teeth mounted on the axle of said valve for engagement with the teeth of said shaft whereby swinging of said pendulum effects rotation of said axle and said valve, said pendulum device residing wholly within said conduit and comprising a freely oscillable shaft, a second shaft depending therefrom, a weighty wheel with vane shaped spokes freely rotatable on said second shaft, gear teeth integral with the lower end of said second shaft, and a gear integral with the axle of said valve in mesh with the teeth on said second shaft for rotation of said valve by said pendulum for up and down grade travel.

5. The combination as set forth in claim 1 wherein said pendulum device comprises a freely oscillable shaft, a weight intermediate the length of said shaft, gear teeth on the lower end of said shaft, and gear teeth mounted on the axle of said valve for engagement with the teeth of said shaft whereby swinging of said pendulum effects rotation of said axle and said valve, said gear teeth being so proportioned that said valve rotates through approximately four times the number of degrees of said pendulum.

AUGUST W. KRETZSCHMAR.